UNITED STATES PATENT OFFICE.

RAYMOND CAHUC, OF TOULOUSE, FRANCE.

IMPROVEMENT IN MINING-POWDERS.

Specification forming part of Letters Patent No. 161,325, dated March 30, 1875; application filed August 21, 1874.

*To all whom it may concern:*

Be it known that I, RAYMOND CAHUC, of Toulouse, Department of the Haute-Garonne, in the Republic of France, have invented a new Mining-Powder, and which serves at the same time for the cure of the phyloxera vastatrix, of which the following is a specification:

The raw materials serving for the manufacture of one hundred kilograms of my powder are as follows: Nitrate of potash, or nitrate of soda, or nitrate of lime, from fifty to sixty kilograms, (which can be used in mixed proportions or separately;) sulphur, from thirteen to sixteen kilograms; tanner's bark, coming out of the pits containing remains of animals, or sawdust, from fourteen to sixteen kilograms, (can be used mixed or separately;) soot or lamp-black, from nine to eighteen kilograms, (can be used mixed or separately;) water, the necessary quantity, and from five to six kilograms of sulphate of iron per hundred kilograms of a mixture of the above-mentioned ingredients.

The preparation of this compound is as follows: In order to facilitate the reactions I pulverize the raw material by means of a millstone, and then place them in a boiler much larger than would be sufficient to just hold the materials on account of the swelling of the materials during the reaction. I then add the sulphated water in quantity sufficient to moisten the materials in the boiler, and heat the whole to between 110° and 120° Fahrenheit, at which point the materials become entirely liquid, and the reactions take place, and when the solid is deposited or formed it is taken off the fire and dried at a high temperature.

In this state the compound is a solid substance, of the form of a more or less fine powder, of a blackish color, and of a density of 0.600, and it may be kept for a very long time without undergoing the least alteration or deterioration. Its purity and greater or less dynamical force depend upon the purity of the raw materials employed and the proportions adopted for its manufacture.

In the atmospheric air it takes fire and burns like any other inflammable body upon the contact of any ignited body, or of a flame of sufficient intensity, without the least shock or the least explosion, whatever may be the quantity of materials submitted to the test. Neither atmospheric electricity, a high temperature of the atmosphere, nor shocks of any kind have any action upon this substance. But when this compound is firmly compressed in the hole of a mine and then lighted it explodes, and produces by the quantity, and especially by the nature, of the gases proceeding from the combustion, a dynamical effect superior (at equal weights used) to the ordinary mining-powder, and equal to that of dynamite used in trade, the low price of this compound giving it a great advantage over other mining-powders.

This compound is without danger in its manufacture, its keeping, or its use, and it can be lighted like the ordinary mining-powder by means of a mining-fuse. It produces in its explosion much less smoke than the common powder, and the gas it emits does not injure the health of the miners, as is the case in dynamite; and in the mine-hole, after its explosion, there is no trace even left of a solid deposit.

This substance, as it is ignited with much difficulty in the atmosphere, and as it does not detonate without being compressed, may be stored in all inhabited places with perfect safety.

I employ the sulphate of iron to prevent the combustion of the composition at a low temperature, and thus materially insure the safety of its use, as from 2,000° to 3,000° of heat are necessary to produce ignition.

This substance, being finely triturated and dissolved in water in the proportion of two kilograms for one hundred liters of water, produces a very good result in the destruction of the phyloxera vastatrix.

Now, having described my invention, what I claim is—

A mining-powder composed of nitrate of potash, sulphur, tanner's bark, lamp-black, water, and sulphate of iron, substantially as described.

RMD. CAHUC.

Witnesses:
 ROBT. M. HOOPER,
 BAILLEY COTTREL.